B. L. MORRISON.
JOURNAL BEARING.
APPLICATION FILED SEPT. 10, 1909.
957,435.  Patented May 10, 1910.
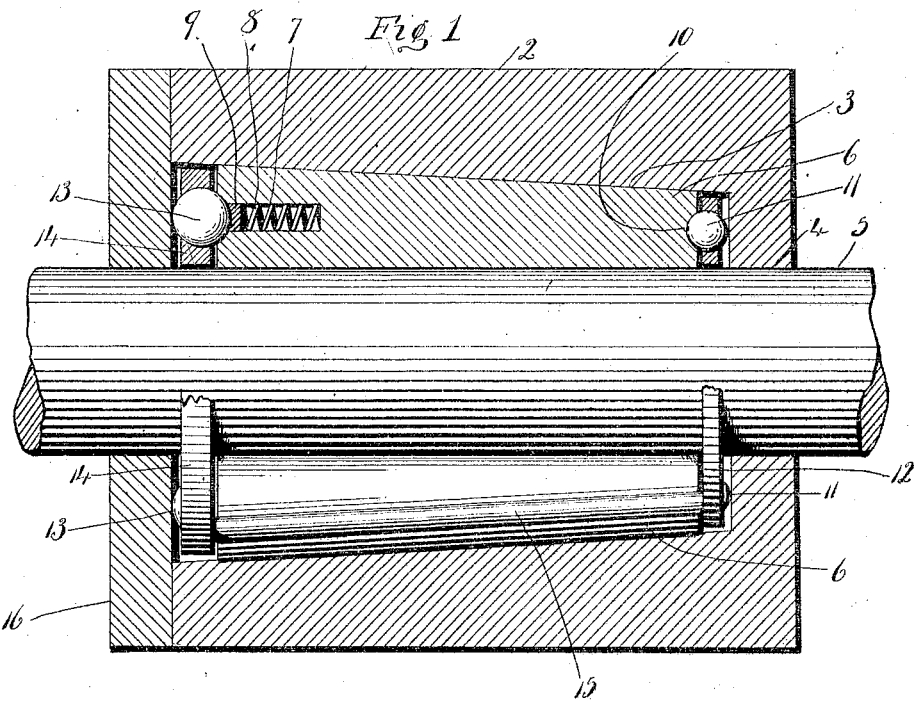
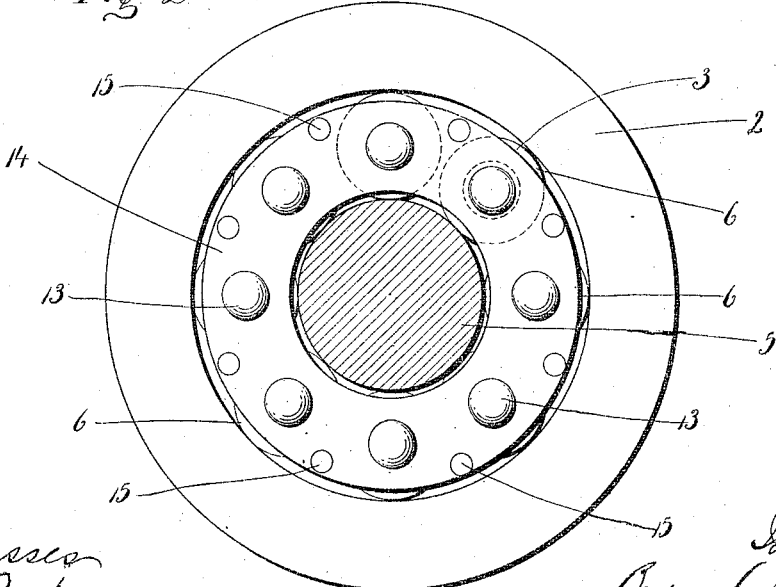
Witnesses
C. J. Reed
C. L. Weed
Inventor
Byron L. Morrison
by Seymour Carr
atty

UNITED STATES PATENT OFFICE.

BYRON L. MORRISON, OF COLORADO SPRINGS, COLORADO, ASSIGNOR OF ONE-THIRD TO JOSEPH W. ADY, OF COLORADO SPRINGS, COLORADO.

JOURNAL-BEARING.

957,435.  Specification of Letters Patent.  Patented May 10, 1910.

Application filed September 10, 1909. Serial No. 517,086.

*To all whom it may concern:*

Be it known that I, BYRON L. MORRISON, a citizen of the United States, residing at Colorado Springs, in the county of El Paso and State of Colorado, have invented a new and useful Improvement in Journal-Bearings; and I do hereby declare the following, when taken in connection with the accompanying drawings and the letters of reference marked thereon, to be a full, clear, and exact description of the same, and which said drawings constitute part of this specification, and represent, in—

Figure 1 a sectional view of a journal bearing embodying my invention. Fig. 2 an end view with the cap removed.

This invention relates to an improvement in journal bearings, and particularly to bearings of roller type, the object of the invention being to provide for the automatic adjustment of the rollers to take up horizontal play and vertical wear; and the invention consists in the construction hereinafter described and particularly recited in the claims.

In carrying out my invention, I employ a journal box 2 of usual external form having a tapered chamber 3, the inner end of the bearing having an opening 4 to clear the shaft 5. Within the bearing are a series of rollers 6 more or less in number according to the size of the shaft, herein represented as eight. These rollers are tapered in the form of truncated cones, and in the larger end of each is a centrally arranged chamber 7 to contain a spiral spring 8 to the outer end of which is attached a Babbitt metal bearing block 9. The smaller ends of the rolls are also formed with a rounded recess 10 to receive portions of anti-friction balls 11 which are mounted in a bearing ring 12. Around the outer ends of the chambers 7 the ends of the rolls are cut away to form bearings for balls 13 which, like the balls 11, are mounted in a bearing ring 14. The rings 12 and 14 are connected together by a series of tie bolts 15 and the outer end of the casing is closed by a cap 16. The balls locate the rolls and hold them in place, and provide a bearing on which they may freely revolve and keep the rolls from rubbing against the ends of the housing, and by providing a spring the rollers automatically adjust themselves so as to take up all horizontal play and vertical wear, as well as eliminating rattling.

I claim:—

1. A journal bearing comprising a housing having a tapered recess, a series of tapered rolls mounted in said recess, bearing balls at the inner ends of said rolls, the outer ends of said rolls chambered, springs mounted in said chambers, and bearing balls at the outer ends of said rolls against which said springs bear.

2. A journal bearing comprising a housing having a tapered recess, a series of tapered rolls mounted in said recess, bearing balls at the inner ends of said rolls, the outer ends of said rolls chambered, springs mounted in said chambers, said springs provided with metal blocks, and bearing balls at the outer ends of said rolls against which said blocks bear.

In testimony whereof, I have signed this specification in the presence of two subscribing witnesses.

BYRON L. MORRISON.

Witnesses:
W. A. CATHEY,
C. A. PRICE.